United States Patent
Hamatani et al.

[11] Patent Number: 6,056,901
[45] Date of Patent: May 2, 2000

[54] METHOD FOR MANUFACTURE OF REGENERATED SYNTHETIC RESIN PRODUCT

[75] Inventors: Tsutomu Hamatani, Namerikawa; Kenshi Hamamori, Uozu, both of Japan

[73] Assignee: YKK Corporation, Toyko, Japan

[21] Appl. No.: 09/143,056

[22] Filed: Aug. 28, 1998

[30] Foreign Application Priority Data

Aug. 29, 1997 [JP] Japan .................................... 9-247615

[51] Int. Cl.⁷ .............................. B29B 9/06; B29B 9/12; B29C 47/00
[52] U.S. Cl. ................................ 264/37.28; 264/37.32; 264/37.33; 264/68; 264/102; 264/143; 264/169; 264/176.1; 264/328.1; 264/331.21; 521/40; 521/48; 528/308.2; 528/502 A; 528/502 C
[58] Field of Search ............................. 264/37.28, 37.32, 264/37.33, 68, 101, 102, 143, 169, 176.1, 328.1, 331.21; 521/40, 48; 528/308.2, 502 A, 502 C

[56] References Cited

U.S. PATENT DOCUMENTS

| | | | |
|---|---|---|---|
| 3,804,811 | 4/1974 | Rose et al. | 528/481 |
| 4,092,458 | 5/1978 | Hoffman | 428/402 |
| 4,255,295 | 3/1981 | Regnault et al. | 521/48 |
| 4,842,799 | 6/1989 | Kusayama | 264/265 |
| 5,225,130 | 7/1993 | Deiringer | 264/102 |
| 5,533,210 | 7/1996 | Maderek et al. | 2/93 |
| 5,648,032 | 7/1997 | Nelson et al. | 264/101 |

FOREIGN PATENT DOCUMENTS

| | | |
|---|---|---|
| 0 031 968 | 7/1981 | European Pat. Off. . |
| 0 698 462 A2 | 2/1996 | European Pat. Off. . |
| 688 448 A5 | 9/1997 | Switzerland . |

*Primary Examiner*—Leo B. Tentoni
*Attorney, Agent, or Firm*—Hill & Simpson

[57] ABSTRACT

A method which is capable of manufacturing regenerated synthetic resin products, particularly slide fastener parts of regenerated synthetic resin, with good quality by using as a raw material such waste synthetic resin materials as emanate from the production line of slide fasteners of synthetic resin or arise from waste plastic products. This method includes granulating the waste synthetic resin material with a rotary blade kept in motion at a high speed and, at the same time, heating the resin material by the heat of friction with the rotary blade, heating and melting the hot granulated synthetic resin and deaerating and extruding the hot molten resin to obtain a strand, and pelletizing the extruded strand thereby forming primary pellets, subjecting the resultant primary pellets to solid-phase polymerization in a vacuum or in an atmosphere of an inert gas at a prescribed temperature thereby forming regenerated pellets, and then forming the regenerated pellets into the shape of a product or the shape of a part aimed at. Preferably, the hot molten resin is subjected to a treatment of filtration for removal of extraneous substance at the step for forming the primary pellets.

9 Claims, 12 Drawing Sheets

METHOD FOR MANUFACTURE OF REGENERATED SYNTHETIC RESIN PRODUCT

BACKGROUND OF THE INVENTION

1. Field of the Invention

This invention relates to a method for the manufacture of regenerated synthetic resin products, particularly parts of regenerated synthetic resin for use in slide fasteners.

2. Description of the Prior Art

At present, the environmental problems of a global scale are posing a serious theme in need of an urgent solution throughout the world.

Among other measures proposed for the solution in question, the perfection of a recycling technique which encourages the decrease of the volume of waste and advances the cyclic use of natural resources has come to attract a close attention as an exceptionally important task.

Particularly, as respects the industrial waste, the law concerning the disposal of waste clearly stipulates that the person concerned should be held responsible for the disposal. Then, the law concerning the promotion of the reclamation of resources recommends, in order to lighten a load of treatment or disposal of the waste also in the production stage, using such materials as permit easy separation into components and allow simple reclamation of separated components, devising convenient structures for products, developing products using raw materials only in small amounts and fulfilling satisfactory functions, and developing unit products easy of mutual separation.

Factories specializing in the manufacture of slide fasteners of synthetic resin are yielding from their production lines large amounts of waste plastics including rejected products, scraps, and waste threads as industrial waste year after year. They incur huge expenses in the disposal of such waste plastics and, therefore, find the efficient utilization of these waste plastics as an all-important problem.

The slide fasteners which are made of synthetic resin, however, have a problem concerning the characteristics which they require to possess. In the case of the slide fasteners, for example, the characteristics such as various mechanical properties and durability to withstand a sliding motion of a slider which the component parts of slide fasteners require to possess are varied. In the regeneration of slide fasteners made of synthetic resin from waste plastics, the reclaimed raw materials inevitably suffer from decline of purity and degradation of quality and, as a result, fail to allow manufacture of products which fully satisfy the various characteristics which the slide fasteners require to possess. Particularly in the case of such thin linear components as multifilaments, the inclusion of minute extraneous particles in the waste plastics possibly results in causing breakage in the regenerated multifilaments. The slide fasteners, therefore, cannot be efficiently recycled from the same viewpoint as that of daily sundries like PET (polyethylene terephthalate) bottles.

Then, the slide fasteners are possessed of decorative factors besides their functional factors. They are required to be dyed in various colors to meet diversified consumers' needs. Particularly in recent years, the desirability of manufacturing slide fasteners numerous in color yet small in lot size has come to find enthusiastic recognition. In the case of the slide fasteners made of synthetic resins which have been regenerated from waste plastics, however, since the raw materials themselves are already colored with various pigments and dyes, it is generally difficult to manufacture products whose component parts are harmoniously and homogeneously colored. The slide fasteners of such synthetic resins as have been reclaimed from the waste plastics, therefore, are preferred to be simultaneously dyed in one and the same colors by means of the piece dyeing.

Even when newly produced synthetic resin materials (virgin materials) are used, however, since the individual component parts such as, for example, those used in fastener tape fibers and those used for the formation of coupling elements, are different in kind of synthetic resin and in kind and quantity of pigment, the fastener tapes and the coupling elements during the course of piece dyeing manifest difference in ability to absorb dye. In the case of an injection molded fastener, since the yarns used for forming the fastener tapes have been drawn in the process of production and the material injected for forming the coupling elements has not been drawn and, therefore, they manifest a difference in degree of crystallization, the fastener tapes and the coupling elements during the course of piece dyeing betray a difference in ability to absorb dye. As a result, it is relatively difficult to dye simultaneously the individual component parts harmoniously and homogeneously. Worse still, it has been held that this simultaneous dyeing is impracticable when the injection molded fasteners are manufactured by using waste plastics as raw materials.

SUMMARY OF THE INVENTION

The basic object of the present invention, therefore, is to provide, for the sake of reusing waste synthetic resin materials such as, for example, waste plastics occurring in the production line for slide fasteners of synthetic resin and wasted slide fasteners made of synthetic resin, a method which is capable of manufacturing regenerated synthetic resin products, particularly parts for slide fasteners made of regenerated synthetic resin, possessing good quality notwithstanding these waste synthetic resin materials are used as raw materials.

A further object of the present invention is to provide a method for manufacturing regenerated slide fastener parts capable of being recycled, which method allows individual component parts to be piece-dyed in a harmonized uniform hue and, as a result, provide slide fasteners made of regenerated synthetic resin satisfying the characteristics which slide fasteners are required to possess.

In accordance with the fundamental embodiment of the present invention, to accomplish the objects described above, there is provided a method for manufacturing a regenerated synthetic resin product which comprises a step of preparing primary pellets by granulating a waste synthetic resin material with a rotary blade, heating and melting the granulated synthetic resin and deaerating and extruding the hot molten synthetic resin to obtain a strand, and then pelletizing the extruded strand; a step of preparing regenerated pellets by subjecting the primary pellets to solid-phase polymerization in a vacuum or in an atmosphere of an inert gas at a prescribed temperature; and a step of forming the regenerated pellets into a prescribed shape.

In a more specific embodiment of the present invention, there is provided a method for manufacturing a part of regenerated synthetic resin for a slide fastener, comprising a step of preparing primary pellets by granulating a waste synthetic resin material with a rotary blade kept in motion at a high speed and, at the same time, heating the waste synthetic resin material by the heat of friction with the rotary blade to a temperature not less than 20° C. lower than the melting point of the resin, deaerating and extruding the hot granulated synthetic resin while further heating and melting it to obtain a strand, and pelletizing the extruded strand; a step of preparing regenerated pellets by subjecting the primary pellets to solid-phase polymerization in a vacuum or in an atmosphere of an inert gas at a prescribed temperature; and a step of forming the regenerated pellets into a prescribed shape of a part for a slide fastener.

In a preferred embodiment, the hot molten synthetic resin is subjected to a filtering treatment in the step of preparing primary pellets to remove foreign matter therefrom. The regenerated pellets which are obtained after the solid-phase polymerization are preferred to have a water content of not more than about 50 ppm and the intrinsic viscosity or limiting viscosity number in the range of from about 0.65 to about 0.8.

In the forming step mentioned above, the regenerated pellets can be extrusion molded or injection molded into various component parts of slide fasteners such as, for example, monofilaments for coupling elements or continuous coupling elements, upper and lower stop members, pin-and-box separators, fibers for fastener tapes, and sliders.

BRIEF DESCRIPTION OF THE DRAWINGS

Other objects, features, and advantages of the invention will become apparent from the following description taken together with the drawings, in which.

DETAILED DESCRIPTION OF THE INVENTION

The method of the present invention, for the sake of manufacturing regenerated pellets of good quality, is characterized by adopting in combination as described above a step of granulating a waste synthetic resin material with a rotary blade kept in rotation at a high speed and, at the same time, heating it by virtue of the heat of friction with the rotary blade, preferably to a temperature lower than the melting point of the resin by 20° C. or more, heating and melting the granulated synthetic resin now at an elevated temperature and deaerating and extruding the hot molten synthetic resin to obtain a strand, and then pelletizing the extruded strand and a step of producing regenerated pellets by subjecting the primary pellets to solid-phase polymerization in a vacuum or in the atmosphere of an inert gas at a prescribed temperature.

The adoption of the step of preparing primary pellets which is described above results in forming primary pellets which have an extremely low water content and suffers only a small decline of the intrinsic viscosity (IV) due to heat deterioration. When these primary pellets are subjected to the solid-phase polymerization, the polymerization proceeds stably without inducing hydrolysis and consequently affords regenerated pellets possessing relatively high intrinsic viscosity and exhibiting quality on a par with the quality of virgin pellets. As a result, it is possible to manufacture the component parts for slide fasteners which fully satisfy the characteristics, which the slide fasteners wished to be obtained are required to possess, and which are as effectively piece-dyable as those obtained from virgin pellets. When the hot molten synthetic resin is subjected in the fluid state thereof to a filtering treatment at the aforementioned step of forming primary pellets, it can be efficiently deprived of minute foreign particles entrained in the waste synthetic material. Even such slender linear materials as multifilaments can be generously saved from the trouble due to breakage.

As concrete examples of the waste synthetic resin materials which can be effectively usable for the method of the present invention, polyesters such as polyethylene terephthalate (PET) and polybutylene terephthalate (PBT), polyamides such as nylon, polyolefins such as polyethylene (PE) and polypropylene, polysulfones (PS), ABS resin, vinyl chloride resin (PVC), and plastic elastomers may be cited. It is preferable to use PET and PBT for the manufacture of fastener parts which are expected to possess high mechanical strength in particular.

The forms in which the waste synthetic resin materials are effectively used herein to manufacture the regenerated pellets include non-woven fabrics, threads, films, and various other similar forms besides various injection molded articles and extrusion molded articles.

Now, the present invention will be described more specifically below by reference to the accompanying drawings.

Figure 1:
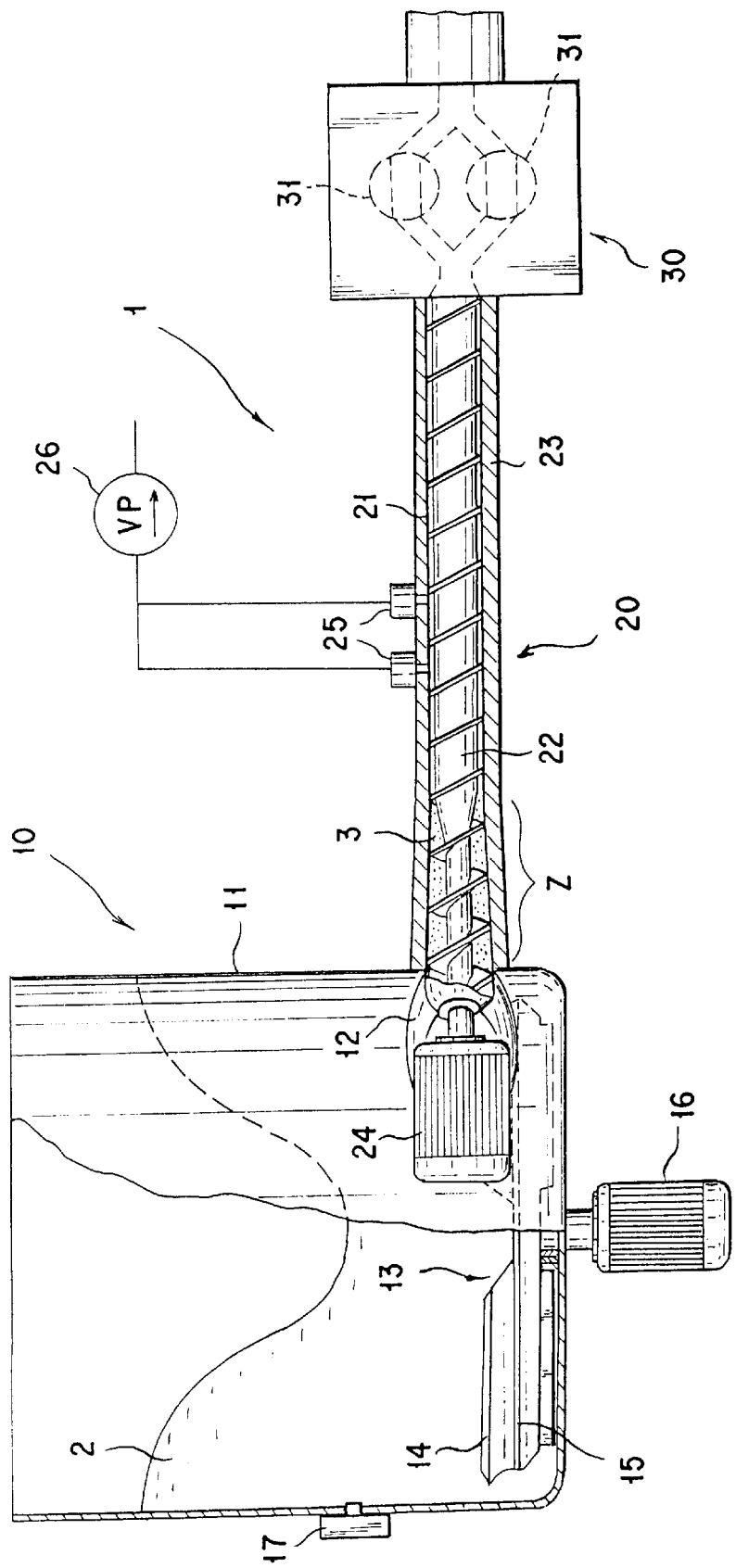
FIG. 1 is a schematic structural diagram illustrating one example of a device for preparing primary pellets to be used for the method of the present invention.
Figure 2:
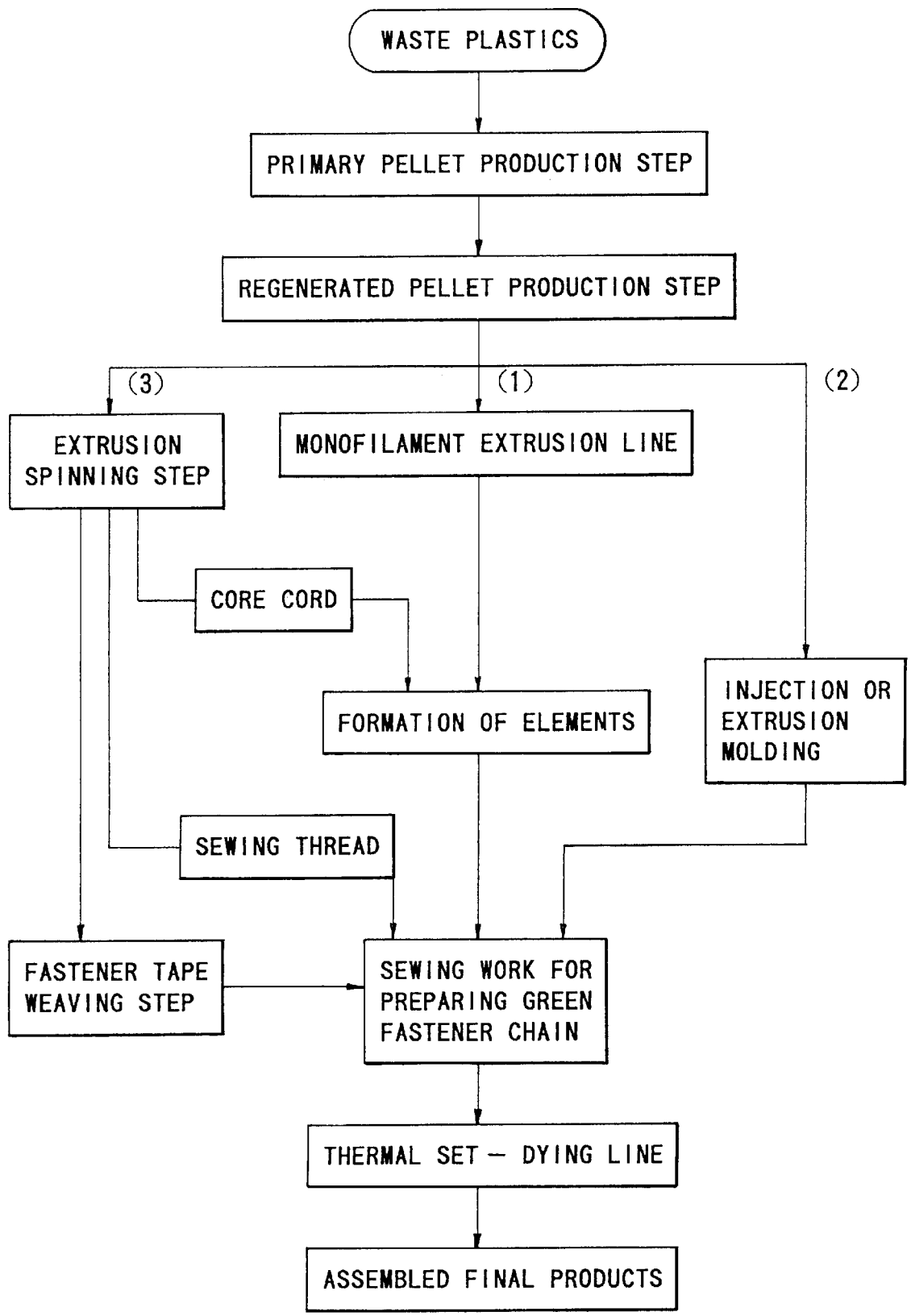
FIG. 2 is a flow diagram schematically illustrating a whole process ranging from a waste synthetic resin material through a finished slide fastener in an assembled state.

FIG. 1 is a diagram schematically illustrating the construction of a preferred embodiment of the device for the manufacture of primary pellets and FIG. 2 is a flow diagram schematically illustrating the whole process ranging from a waste synthetic resin material as a raw material through a finished slide fastener in an assembled state.

To begin with, the waste synthetic resin material, such as severed edges, scraps, rejected products, and disassembled waste products which emanate from the production line, is deprived of metallic parts entrained therein by a metal separating device and then conveyed by such a suitable conveying device as a belt conveyor or reel feeder which fits the form of waste plastic and fed into a granulating device 10 of a primary pellet production apparatus 1 illustrated in FIG. 1. The primary pellet production apparatus 1 is composed of a continuous line which integrates the granulating device 10, an extruder 20, and a pelletizer (not shown).

With reference to FIG. 1, the granulating device 10 is composed of a housing 11 and a cutter-compactor 13 disposed in the bottom part of the housing 11. The cutter-compactor 13 is provided with rotary blades 14 and stationary blades 15. The rotary blades 14, when rotated at a high speed by a motor 16, cooperate with the stationary blades 15 to granulate a waste synthetic resin material 2. By the heat of friction which is generated when the rotary blades 14 in rotation at a high speed is enabled to granulate the waste synthetic resin material 2 in cooperation with the stationary blades 15, the granulated resin is heated preferably to an elevated temperature about 20° C. lower than the melting point of the resin. The temperature of this resin at this time is monitored with a temperature monitoring device 17. This heating results in removing the water contained in the resin (first removal of water). Even the waste synthetic resin material having a water content on the order of 4–8%, though depending on the degree with which the second removal of water which will be described herein below is carried out, can be fed directly into the granulating device 10 without undergoing the preliminary drying at an elevated temperature and can be saved generously from the otherwise inevitable decline of the intrinsic viscosity (IV) due to heat deterioration. Further, the rotation of the rotary blades 14 at a high speed enables the supplied waste synthetic resin material to be granulated, mixed, heated, dried, and agglomerated simultaneously by one step and the centrifugal force generated by the rotary blades 14 allows the granulated resin to be incessantly supplied at a fixed volume to a discharge outlet 12 disposed in the lower lateral part of the housing 11.

The hot granulated resin which has been supplied via the discharge outlet 12 to the extruder 20 is plasticized and injected as pressed into a cylinder 21 by a screw 22 rotated by a motor 24 and, at the same time, heated and melted by a heater 23 attached to the outer peripheral surface of the cylinder 21. In this while, the air entrapped in the cylinder 21 is forcibly withdrawn by a vacuum pump 26 through an air discharging part 25 fitted in the cylinder 21. Owing to the provision of the vacuum vent mechanism of this principle, the water contained in the molten resin 3 which has been homogenized by the screw 22 is removed (second removal of water). The air, oil, and other extraneous substances which are additionally entrained by the molten resin are simultaneously removed with the water. Since the granulated resin which has been already heated to an elevated temperature is supplied to the extruder 20, the compression zone Z of the extruder 20 can be appreciably shortened as compared with that of the standard extruder and, as a result, the oxidation (heat deterioration) of the resin can be repressed to the fullest possible extent.

The molten resin 3 in the extruder 20 is injected as pressed by the screw 22 into an autofilter device 30 and then divested therein of such extraneous substances as dust, sand, and wood chips by an autofilter changer 31. The autofilter changer 31 is furnished with a backflush mechanism which is enabled by the operation of two pistons each provided with two screens to effect interchange of the screens between a resin flow line and a backwash line led to the outside of the device and to allow one pair of screens to be backwashed and keep the other pair of screens in operation meanwhile. Thus, the removal of extraneous substances can be efficiently performed without interrupting the continuous operation. The mesh size of these screens generally proves proper when the size is in the range of 400–600 meshes and the mesh diameter is in the approximate range of 35–20 $\mu$m. When the screens are given a considerably small mesh size for the purpose of attaining removal of very minute extraneous particles, the molten resin incurs increased difficulty in passing the screens. In all the component parts for slide fasteners, the fibers for fastener tapes have the smallest diameters. Since these fibers have diameters in the approximate range of 15–20 $\mu$m, they must be divested of extraneous particles having a larger diameter.

The molten resin which has been filtered by the autofilter device 30 is supplied to a pelletizer (not shown) and pelletized therein in the shape of strand chips to afford the primary pellets.

Owing to the step of preparing the primary pellets described above, the produced primary pellets have an extremely low water content and suffers only small decline of the intrinsic viscosity due to heat deterioration because the external heating and melting work to be performed at all is limited to the step of extrusion.

Incidentally, as the method for regeneration and granulation of waste synthetic resin materials, the Grush method has been well known. This Grush method effects manufacture of granulated chips of a fixed particle diameter by provisionally melting a waste synthetic resin material, combining the molten resin with water and cooling the resultant mixture, then coarsely grinding the solidified mixture by the use of a cutter, subsequently finely grinding the coarse granules, and adjusting the produced powder in particle diameter (classification by sifting). The Grush method poses the problem that the water used for the cooling induces hydrolysis during the subsequent solid-phase polymerization of the resin, i.e. the occurrence of the decomposition reaction of the resin simultaneously with the polymerization reaction, and the polymerization will not proceed to a fully satisfactory degree and the produced resin will not acquire sufficiently high intrinsic viscosity. In contrast, the method described previously includes no step requiring addition of water and is capable of removing the water substantially completely by the first removal of water (drying with the heat of friction) and the second removal of water (vacuum deaeration). In the subsequent solid-phase polymerization of the resin, therefore, the hydrolysis which is suffered to occur at all proceeds only to a slight degree and the polymerization reaction proceeds thoroughly and the intrinsic viscosity of the produced resin rises amply. Incidentally, the water which is contained inside the resin is not easily removed once the resin has been pelletized. That is to say, the heating which is made during the course of the solid-phase polymerization is capable of removing the water from the surface of the resin and is incapable of removing the water from within the resin. From the viewpoint of the quality of the regenerated pellets, therefore, the removal of water should be amply effected during the production of primary pellets as involved in the method described above.

The primary pellets which have been produced as described above are then subjected to the solid-phase polymerization to give birth to regenerated pellets having both polymerization degree and intrinsic viscosity thereof exalted to the magnitudes respectively aimed at. The solid-phase polymerization is performed for the purpose of enabling the material whose properties have been deteriorated (decrease of molecular weight, for example) once by thermal hysteresis at the step of preparing the primary pellets mentioned above to acquire an increase in the molecular weight and an addition to the quality enough to compare with that of virgin pellets. The reaction system, prior to the solid-phase polymerization, must be deprived of $H_2O$ and $O_2$, the substances which are causes for the hydrolysis, to the fullest possible extent. Since the $H_2O$ has been removed to an appreciable extent at the aforementioned step of producing the primary pellets, it now suffices to remove the $O_2$ which is contained particularly in the air. For the sake of expelling the $O_2$ and the $H_2O$ as well from the reaction system, the solid-phase polymerization is carried out in a vacuum or in the atmosphere of such an inert gas as He, Ar, or $N_2$. When the solid-phase polymerization is performed in a vacuum, the degree of vacuum is properly not more than 0.2 Torr, preferably not more than 0.1 Torr.

The advance of the polymerization reaction is affected by such factors as the degree of vacuum, the temperature of treatment, the duration of treatment, and the water content of the resin. Among other factors enumerated above, the temperature of treatment and such environmental conditions as the degree of vacuum are particularly important for the reaction. The conditions for the solid-phase polymerization should be properly selected to suit the kind of waste synthetic resin material to be used. Depending on the kind of the resin, the reaction system can incorporate therein a polymerization catalyst, a solvent, etc. In the case of PET, for example, however, the selection of the temperature and the environment conditions allows the reaction to proceed easily in the direction of polymerization rather than decomposition without requiring use of a catalyst or a solvent. Further, in the case of PET, since the polycondensation reaction by-produces water, it is proper to expel the by-produced water from the reaction system by heightening the degree of vacuum or to remove the water from the reaction system by passing a stream of an inert gas through the system. The solid-phase polymerization is carried out to a point where regenerated pellets having a water content of not more than about 50 ppm (0.005%), preferably not more than 20 ppm, and the intrinsic viscosity in the approximate range of 0.65–0.8, preferably 0.7–0.76 are obtained. Though the temperature of treatment is properly selected to suit the kind of resin to be polymerized, it is preferred to be in the approximate range of 185–200° C. in the case of a polyester such as PET. The duration of the reaction is proper in the approximate range of 10–12 hours. The primary pellets, prior to the solid-phase polymerization, are preferred to be deprived of the water contained therein to the fullest possible extent and, for the sake of promoting the polymerization reaction, to be dried at an elevated temperature as placed under a reduced pressure or kept swept with an inert gas. The degree of vacuum in this case, unlike that in the case of the solid-phase polymerization, is only required to be sufficient for the removal of the water from the system. As respects the conditions for the drying treatment which somehow depend on the kind of resin, generally the temperature of treatment is properly not higher than 170° C. and the duration of treatment is appropriate in the approximate range of 8–10 hours.

Particularly in the preparation of regenerated pellets for use in the production of monofilaments, it is important that the water content of the dry chips should be repressed to the lowest possible extent for restraining the decline of the intrinsic viscosity (I.V.) before and after the work of monofilament extrusion. The decline of the intrinsic viscosity before and after the work of monofilament extrusion is considered to originate in the hydrolysis of the resinous material caused by the water contained in the pellets and is liable to induce breakage of the monofilament during the course of drawing. The water content of the regenerated pellets, therefore, should be restrained to a preferred level of not more than 30 ppm, more preferably not more than 20 ppm. Particularly, in the manufacture of such products as sewing threads and multifilaments which have minute diameters, the water content should be kept at a level of not more than 20 ppm, preferably not more than 10 ppm, and more preferably not more than 5 ppm in consideration of the possibility of breakage thereof. The intrinsic viscosity of the regenerated pellets is preferred to be so high as to fall in the approximate range of 0.7–0.76, most preferably 0.72–0.75, in consideration of the possible decline of viscosity after the work of extrusion. For this reason, the temperature of the vacuum drying is preferred to be in the approximate range of 150–170° C. and the temperature of the solid-phase polymerization in the approximate range of 190–200° C.

The regenerated pellets thus obtained are molded in the form of a synthetic resin product aimed at. They are subjected, for example, to the following molding steps which suit the component parts of a slide fastener, as shown in FIG. 2.

(1) Monofilaments are extrusion molded and stretched to form coiled or zigzagging linear coupling elements.

(2) Coupling elements, upper and lower stop members, pin-and-box separators, sliders, etc. are injection molded or extrusion molded.

(3) A molten synthetic resin is extrusion spun to produce fibers and the fibers are woven and/or knitted to produce a fastener tape. Otherwise, core cords or sewing threads are manufactured from the fibers obtained by the step of extrusion spinning. In this case, since no very high mechanical strength is required, a waste synthetic resin material may be additionally mixed into a raw material.

The various component parts thus obtained are used to form slide fastener chains and these slide fastener chains are thermally set and dyed to obtain a slide fastener as a finished assembled product. Since the regenerated pellets which are obtained by the present invention are substantially equal in quality to virgin pellets, they enjoy good dyeability and induce virtually no heat deterioration due to dyeing.

In the reproduction of slide fasteners of synthetic resins, the question as to what kinds of synthetic resin materials are suitable for this purpose is judged depending on the form of a slide fastener as a product and the constructions of individual component parts of a slide fastener. Some cases require that the slider itself, for example, should be manufactured from other synthetic resin or a metal, depending on the function or construction which is expected from the slide fastener. In such cases, the slider can be manufactured from the material which is so needed. In the case of the slide fastener using the slider of this description, it is relatively easy to recover the sliders selectively from the discarded slide fasteners and the discarded plastic materials emanating from the production line can be wholly reclaimed. Then, the question whether or not the slide fasteners manufactured by using waste synthetic resin materials can be simultaneously dyed by piece dyeing depends on the kinds of relevant synthetic resins. Particularly, slide fasteners manufactured from polyesters or polyamides permit the component parts thereof to be simultaneously dyed in one and the same hue by means of piece dyeing.

Now, the modes of embodying the present invention in the individual component parts of a slide fastener will be specifically described below with reference to various slide fasteners which are illustrated in the accompanying drawings.

Figure 3:
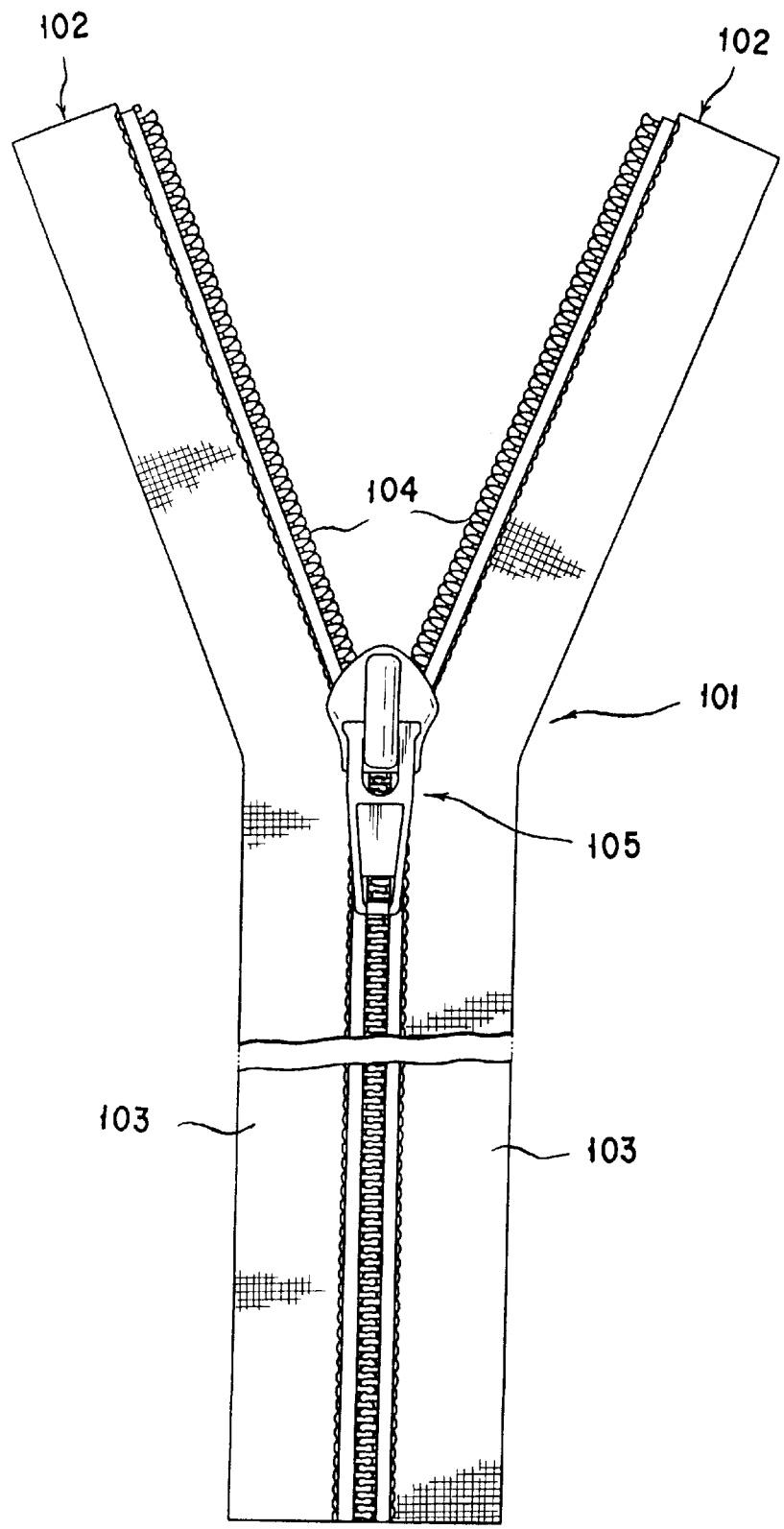
FIG. 3 is a plan view illustrating one basic form of a slide fastener made of a synthetic resin.

FIG. 3 illustrates a slide fastener 101 which is used for opening and closing the opening in a garment or a bag and depicts the form of a product having the upper and lower ends of laterally paired fastener stringers 102 cut off. The fastener stringers 102 are composed of fastener tapes 103 made of synthetic resin and a row of coupling elements (coiled coupling elements) 104 made of synthetic resin attached fast to each of the opposed longitudinal edges of the fastener tapes 103. The fastener tapes 103 are formed by weaving and/or knitting synthetic resin fibers, manufactured from a non-woven fabric, or made of a sheet of synthetic resin. The coupling elements 104 are known in various forms such as, for example, those of the type obtained by injection molding the individual coupling elements and simultaneously attaching them fast to the edges of the fastener tapes, the continuous coupling elements such as the coiled coupling elements obtained by winding a monofilament of synthetic resin in the shape of a coil and the so-called zigzag coupling elements obtained by alternately connecting vertically in a zigzagging pattern in the longitudinal direction the portions bent in the shape of a letter U in the lateral direction in a plane, and the extrusion molded coupling elements obtained by attaching the opposite end portions of the individual coupling elements by means of extrusion molding to the two separate connecting cords (core cords) laid parallel to each other in the longitudinal direction thereby forming a composite resembling a ladder and bending the composite in the shape of a letter U around the longitudinal center line thereof. These examples of various coupling elements will be described afterward with reference to the relevant drawings. Then, the coiled coupling elements which include a core cord and a sewing thread among the component parts thereof will be also described afterward with reference to the relevant drawings. The reference numeral 105 denotes a slider which is slidable along the opposed rows of coupling elements for making and breaking engagement of the coupling elements.

Figure 4:
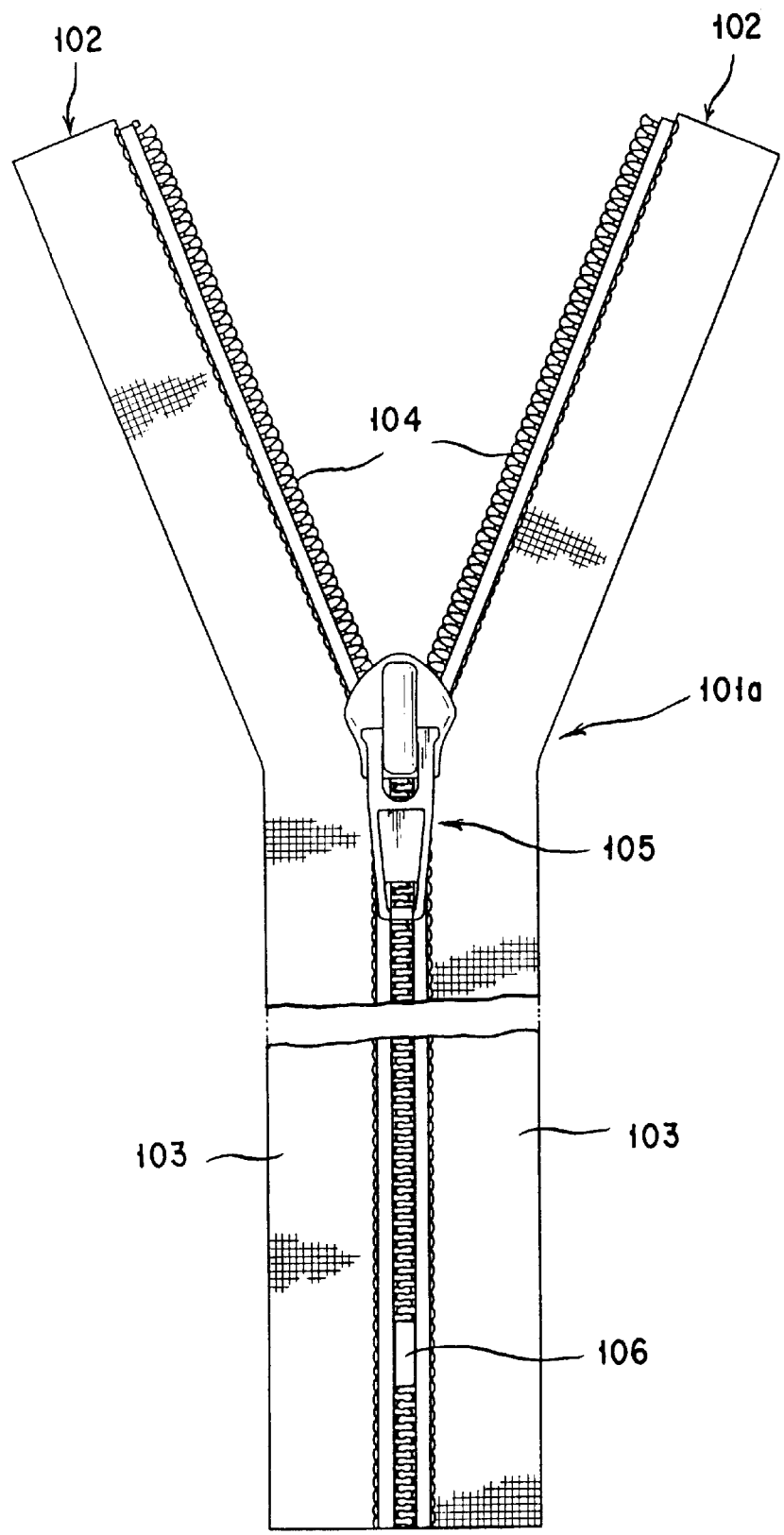
FIG. 4 is a plan view illustrating another form of a slide fastener made of a synthetic resin.

A slide fastener 1a illustrated in FIG. 4 is in a form having the upper ends of the two fastener stringers 102 cut off. It is different from the slide fastener illustrated in FIG. 3 in respect that a lower stopping part 106 is formed by fusing the prescribed lower portions of the engaged rows of coupling elements 104.

Figure 5:
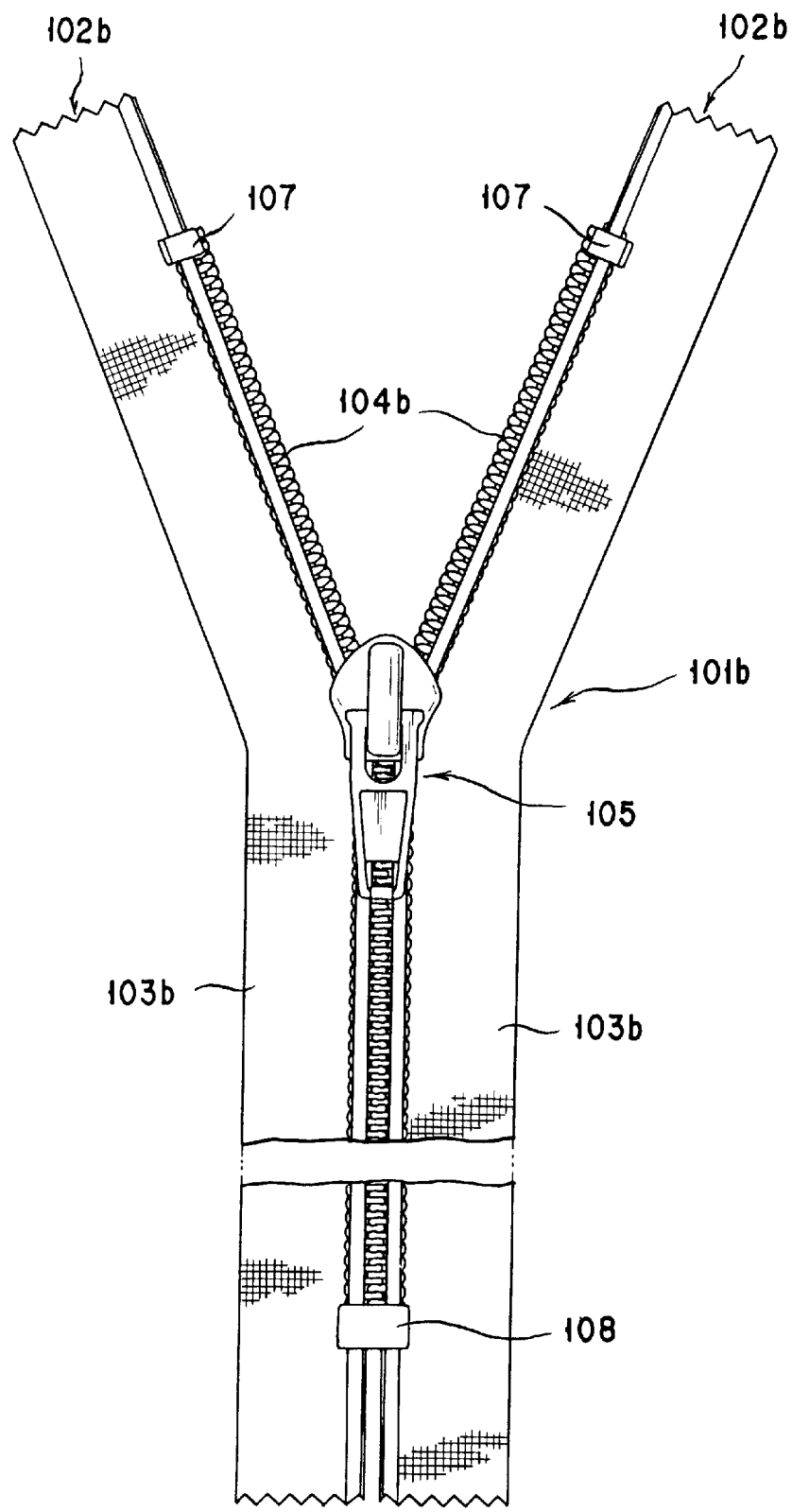
FIG. 5 is a plan view illustrating still another form of a slide fastener made of a synthetic resin.

A slide fastener 101b illustrated in FIG. 5 is different from the slide fastener illustrated in FIG. 3 in respect that upper stop members 107 are attached respectively to the upper ends of the rows of coupling elements 104b attached fast to fastener tapes 103b of fastener stringers 102b and a lower stop member 108 is attached to the lower ends thereof.

Figure 6:
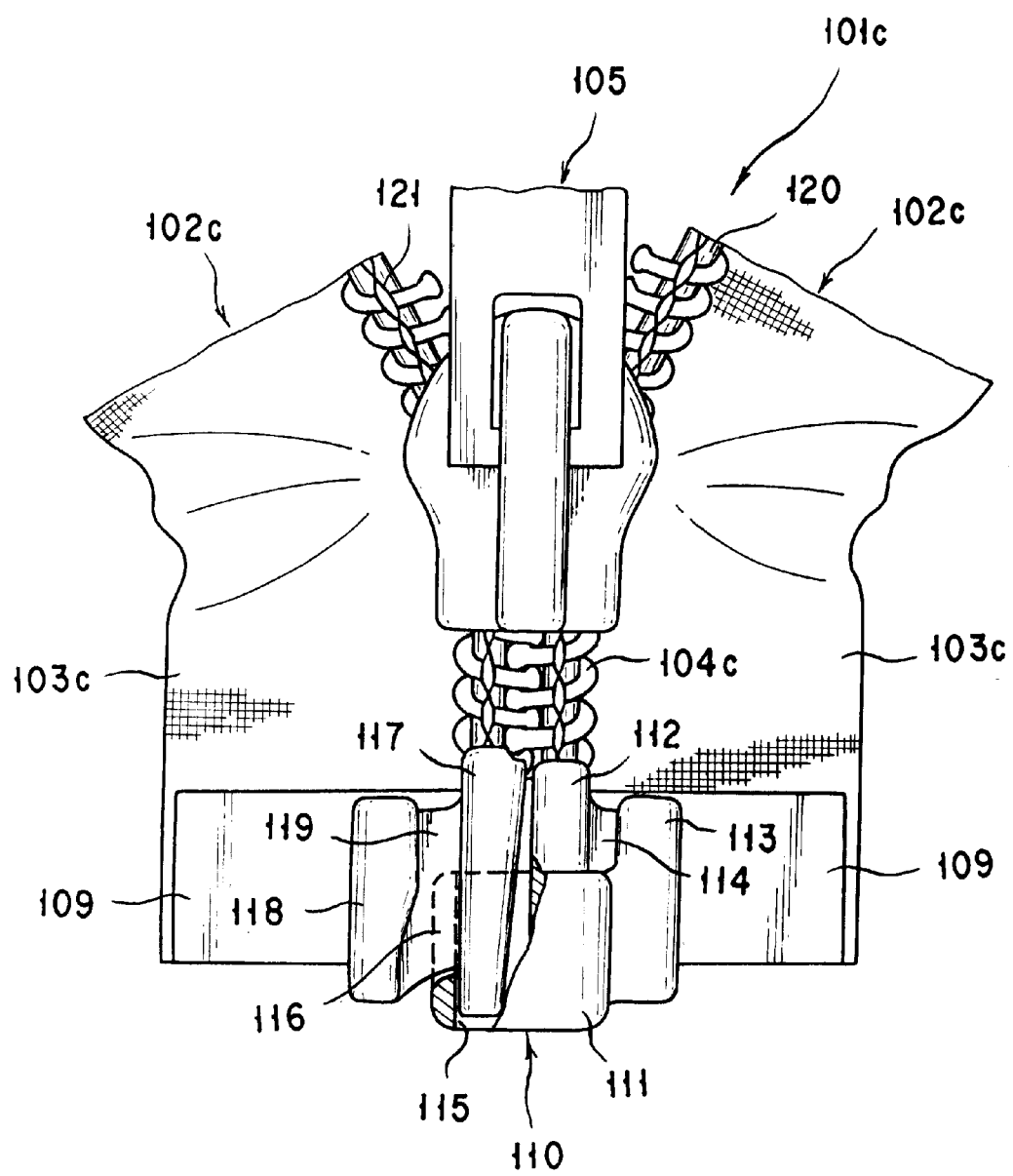
FIG. 6 is a partially cutaway plan view illustrating another form of a slide fastener made of a synthetic resin.

FIG. 6 illustrates an open-link type slide fastener 101c. To the lower end portions of fastener tapes 103c of fastener stringers 102c, reinforcing sheet-like members (taffeta) 109 are welded through the medium of an adhesive layer (not shown). A box member 111 of a pin-and-box separator 110 is attached to the inner edge of one of the opposed reinforcing sheet-like members 109 and a butterfly rod or pin 117 is attached to the inner edge of the other reinforcing sheet-like member 109. The box member 111 is formed integrally with a guide projecting part 113 adjoining the box member 111 and a box rod 112 and a groove 114 is formed as interposed between the box rod 112 and the guide projecting part 113 so as to admit therein the lower end part of the slider 105 by slippage. Similarly, a guide groove 119 is formed between the butterfly rod 117 and a guide ridge 118 formed integrally with the adjoining butterfly rod 117. A butterfly rod inserting hole 115 is formed as pierced in the vertical direction in the left side portion of the box member 111 and a lateral groove 116 is formed on the outer wall of the butterfly rod inserting hole 115. When the butterfly rod 117 is inserted into the butterfly rod inserting hole 115 of the box member 111, therefore, the insertion can be smoothly carried out because the inner side of the lower end of the guide ridge 118 slide on the edge of the lateral groove 116 of the box member 111 so as to guide the butterfly rod 117.

With reference to FIG. 6, the reference numeral 120 denotes a core cord which is inserted in the longitudinal direction through the empty space inside the spiral of the coiled coupling element 104c and the reference numeral 121 denotes a sewing thread sewing the core cord 120 and the coiled coupling element 104c along the longitudinal edge of the fastener tape 103c.

The pin-and-box separator does not need to be limited to what is illustrated in FIG. 6. The so-called reverse open-link type using the same box member as in the construction of the slider 105 and enabling the slider fastener to effect engagement and disengagement of the opposed rows of coupling elements at the lower end thereof, for example, has been known as one version thereof.

Further, the embodiment, as illustrated in the diagram, uses reinforcing sheet-like members which are formed separately of the pin-and-box separator and welded to the lower end portion of each of the fastener tapes. The reinforcing sheet-like members do not need to be limited to this particular construction. The reinforcing members can be integrally formed with the pin-and-box separator as found, for example, in a construction which has a sheet-like portion produced by injection molding a synthetic resin material integrally with a box member or a butterfly rod and fixed to the entire width of the fastener tape or a construction which has slits of an arbitrarily selected pattern inserted in a sheet-like portion thereby imparting flexibility thereto.

Figure 7:
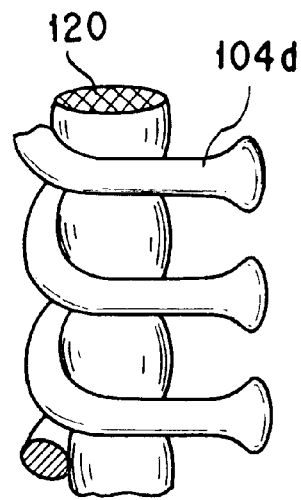
FIG. 7 is a fragmentary plan view of a spiral coil coupling element provided with a core cord.
Figure 8:
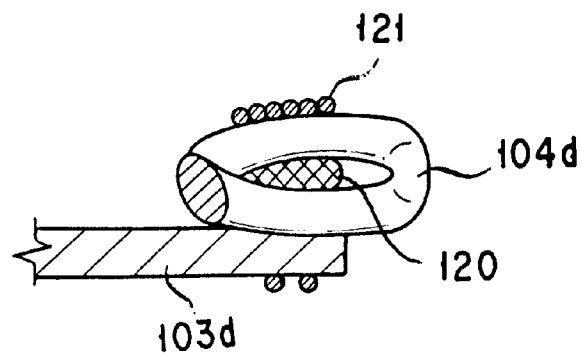
FIG. 8 is a fragmentary cross-sectional view illustrating one state of fixing the coiled coupling element provided with a core cord shown in FIG. 7 to a fastener tape.
Figure 9:
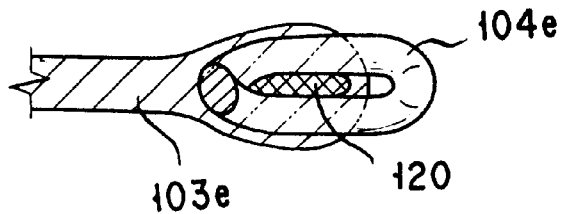
FIG. 9 is a fragmentary cross-sectional view illustrating another state of fixing the coiled coupling element provided with a core cord shown in FIG. 7 to a fastener tape.
Figure 10:
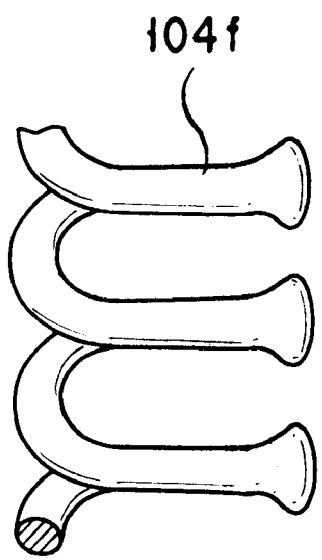
FIG. 10 is a fragmentary plan view of a coiled coupling element devoid of a core cord.
Figure 11:
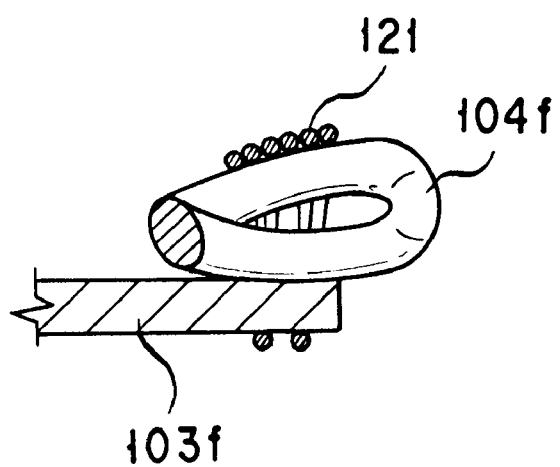
FIG. 11 is a fragmentary cross-sectional view illustrating a state of fixing the coiled coupling element shown in FIG. 10 to a fastener tape.

FIG. 7 through FIG. 11 illustrate examples of coupling elements which are formed by coiling a monofilament of synthetic resin. FIG. 8 illustrates an example of having sewn to the longitudinal edge of a fastener tape 103d with a sewing thread 121 a coiled coupling element 104d having the core cord 120 of synthetic resin fibers inserted through the empty space within a spiral in the longitudinal direction as illustrated in FIG. 7. In contrast, FIG. 9 illustrates an example of having a coiled coupling element 104e attached to the longitudinal edge of a fastener tape 103e as encircled with the tape at the same time that the tape is woven. FIG. 11 illustrates an example of having sewn to the longitudinal edge of a fastener tape 103f with the sewing thread 121 a coiled coupling element 104f having no core cord inserted through the empty space within a spiral as illustrated in FIG. 10.

Figure 12:
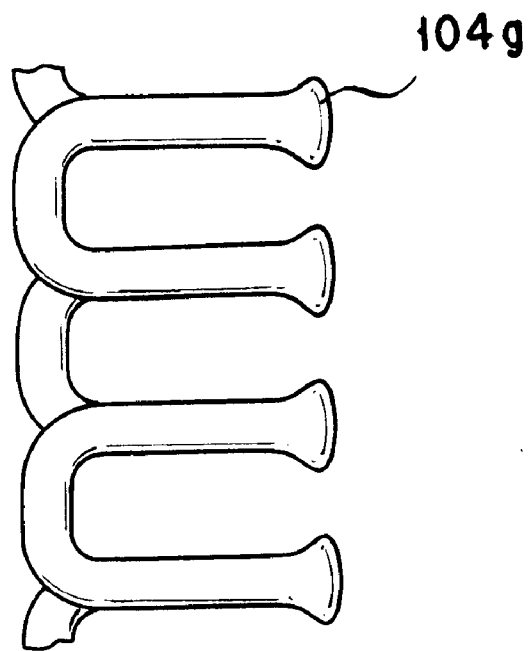
FIG. 12 is a fragmentary plan view of a zigzag-like coupling element.
Figure 13:
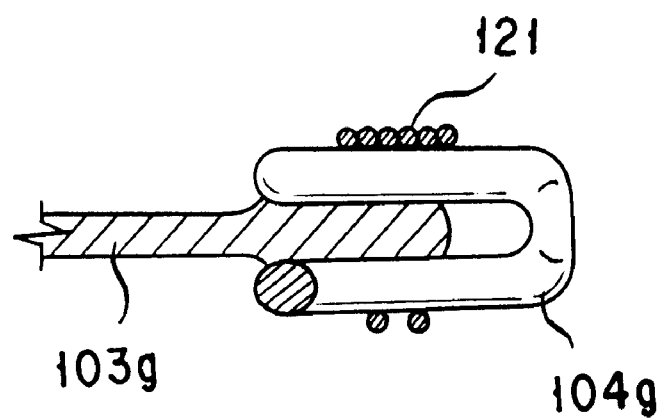
FIG. 13 is a fragmentary cross-sectional view illustrating a state of fixing the zigzag coupling element shown in FIG. 12 to a fastener tape.

FIG. 12 illustrates a so-called zigzag coupling element 104g which is obtained by forming U-shaped bends of a monofilament of synthetic resin each lying laterally in a plane and alternately connecting the U-shaped bends vertically in the longitudinal direction. The vertically adjacent bends are sewn with the sewing thread 121 to the longitudinal edge of a fastener tape 103g nipped therebetween.

Figure 14:
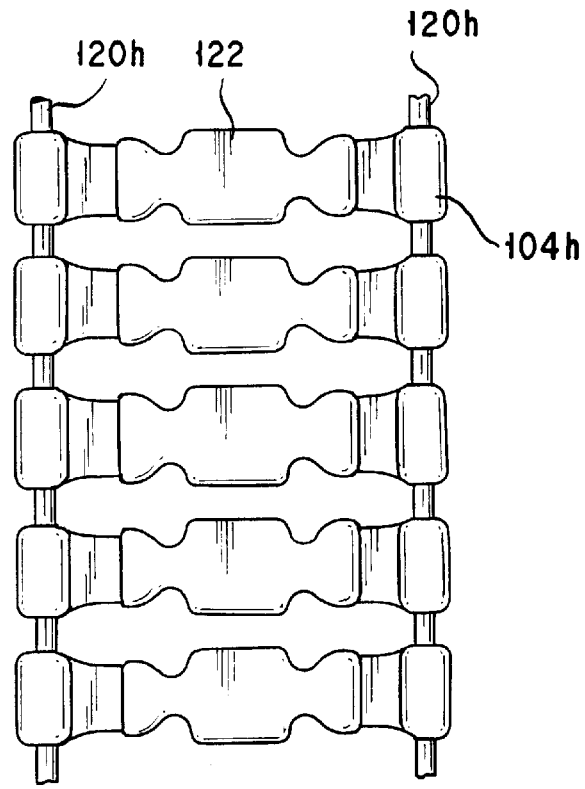
FIG. 14 is a fragmentary plan view of coupling elements fixed by extrusion molding to connecting cords.
Figure 15:
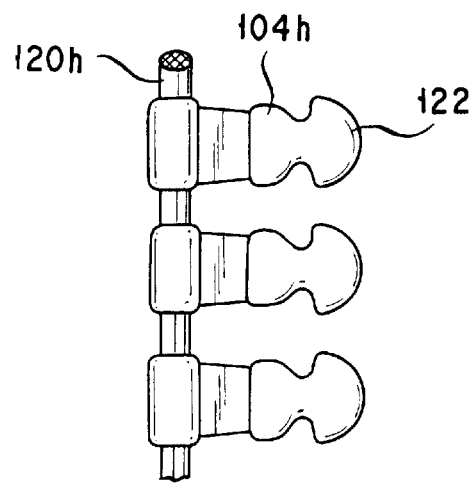
FIG. 15 is a fragmentary plan view illustrating the coupling elements shown in FIG. 14 as posed in a state bent in the shape of a letter U around the engaging portion thereof as the center.
Figure 16:
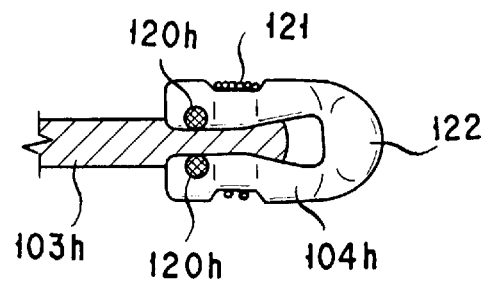
FIG. 16 is a fragmentary cross-sectional view illustrating a state of fixation of the coupling elements shown in FIG. 14 and FIG. 15 to a fastener tape.

FIG. 14 through FIG. 16 illustrate an example of attaching the opposite end portions of regularly spaced individual coupling elements 104h by means of an extruder to two separate connecting cords (core cords) 120h laid parallel to each other in the longitudinal direction thereby forming a composite resembling a ladder as illustrated in FIG. 14, bending the composite in the shape of a letter U around an engaging portion 122 as a center as illustrated in FIG. 15, and sewing the bent composite to the longitudinal edge of a fastener tape 103h with the sewing thread 121 as illustrated in FIG. 16.

Figure 17:
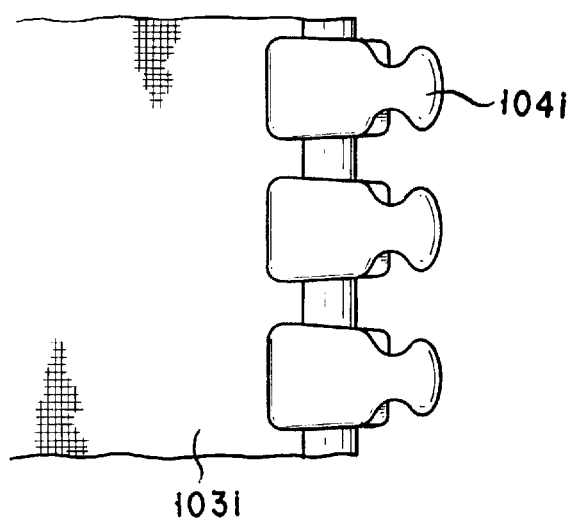
FIG. 17 is a fragmentary plan view illustrating a slide fastener having individual coupling elements of synthetic resin attached fast to the longitudinal edge of a fastener tape having a circularly swelled cross section.
Figure 18:
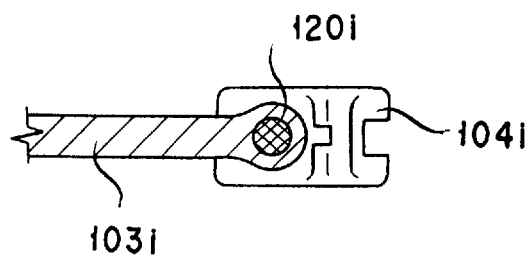
FIG. 18 is a fragmentary cross-sectional view illustrating the slide fastener shown in FIG. 17.

In contrast, FIG. 17 and FIG. 18 illustrate an example of attaching a core cord 120i by weaving into the longitudinal edge of a fastener tape 103i at the same time that the tape is woven and attaching individual coupling elements 104i of synthetic resin by injection molding as regularly spaced to the longitudinal edge swelled into a circular cross section of the fastener tape 103i formed as described above.

The recyclable slide fastener of synthetic resin manufactured according to the present invention can be applied not only to the slide fasteners of the types illustrated in FIG. 3 through FIG. 18 but also to various fastener products. It can be applied, for example, to a railed fastener product, i.e. a fastener of the type having a groove formed along the edge of one of paired opposed sheet members of a container bag and a ridge matched to the groove and formed similarly on the other sheet member such that the bag is closed by bringing the groove and the ridge into mutual engagement. Likewise in this type of slide fastener, a slider adapted to slide along the opposed edges of the bag for the purpose of closure is utilized.

The selection of the type of fastener product for proper application of the regenerated synthetic resin material depends also on the kind of synthetic resin to be used for the product. Generally, nylon 6 and nylon 66 among other polyamide resins and such polyolefin resins as polyethylene and polypropylene are suitable for such slide fasteners as are shown in FIG. 3 through FIG. 18. Nylon 11 and nylon 12 among other polyamide resins and such vinyl chloride resins as polyvinyl chloride and various copolymers of vinyl chloride with vinyl acetate, vinylidene chloride, acrylonitrile, ethylene, or propylene are suitable for the railed fastener product. The polyester resins are suitable for both the slide fasteners and the railed fasteners. Now, the preferred modes of application of varying synthetic resin materials will be described below.

When the synthetic resin material is polyethylene terephthalate (PET), basically the PET can be used for all the component parts of a slide fastener. Preferably, however, the slider which is required to possess high mechanical strength is made of polybutylene terephthalate (PBT) instead, with the PBT in the body portion of the slider reinforced with such reinforcing fibers as glass fibers. In recycling the slide fastener of polyester answering this description, it is preferable to remove the slider from the slide fastener discarded as no longer useful and utilize the remainder of the slide fastener exclusively for the sake of reclamation. When the used slide fastener is wholly recovered and put to reclamation, the material that is obtained at all is in the form of a PET/PBT polymer blend. In the case of such an open-link type slide fastener as illustrated in FIG. 6, the pin-and-box separator is preferred to be made of PBT likewise on account of mechanical strength. In any of the cases mentioned above, however, the component parts of the slide fasteners can be simultaneously dyed in the same hue by piece dyeing because the materials for the component parts are invariably polyester. Though various dyes are usable for the piece dyeing, a disperse dye is used preferably. The disperse dye that can be used herein is known in various types such as, for example, quinone type disperse dyes, azo type disperse dyes, and anthraquinone type disperse dyes. Various dyeing assistants in popular use such as leveling agents and dye fastness promoters can be additionally incorporated in a dye bath as is usually practiced. While various methods are available for the dyeing under discussion, the method of beam dyeing proves to be advantageous.

In setting the used polyester slide fastener to the process of recycle, the reclaimed polyester may be used for manufacturing a slide fastener again or for manufacturing other fastener products such as separable face fasteners or hook-and-loop fasteners, textile products, and molded articles such as binding bands for packages and containers. When the reclaimed polyester is used as the raw material for other molded articles, it may incorporate therein a varying filler like such reinforcing fibers as glass fibers, carbon fibers, or aramid fibers or it may be blended with such other thermoplastic resin as PBT. The same remarks hold good for the polyolefins and the polyamides which will be described afterward. In manufacturing a slide fastener by using reclaimed PET, the slider, pin-and-box separator, coupling elements, and sewing thread which require high mechanical strength are preferred to use virgin PET or a blend of virgin PET with reclaimed PET.

When the synthetic resin material is a polyolefin, particularly polypropylene (PP), all the component parts of a slide fastener, i.e. fastener tapes, coupling elements, a pin-and-box separator, reinforcing sheet-like members, upper and lower stop members, a sewing thread, a core cord, and a slider can be made of PP. In the case of a slide fastener which is made wholly of PP, therefore, the recovery of the used product has no use for the work of selecting only the slider. That is to say, the used product can be wholly recovered and utilized for the purpose of reclamation. Further, the reclaimed PP, similarly to the reclaimed polyester mentioned above, can be used as the raw material for textile products and such molded articles as binding bands and containers and also as the raw material for the component parts of a slide fastener.

The slide fastener made wholly of PP, however, is not easily colored by piece dyeing. For this slide fastener to be easily colored, therefore, it becomes necessary to manufacture regenerated pellets which are colored with a pigment.

When the synthetic resin material is a polyamide, all the component parts of a slide fastener except a slider, i.e. fastener tapes, coupling elements, a pin-and-box separator, reinforcing sheet-like members, upper and lower stop members, a sewing thread, and a core cord, can be made of the polyamide. The slider in this slide fastener can be made of the PBT mentioned above or a metal. When the slide fastener of polyamide answering this description is used in the recycling path, the slider is removed from the used slide fastener and the remainder of slide fastener is recycled. As concrete examples of the use found for the reclaimed polyamide, the component parts of a slide fastener excepting a slider, face fasteners and other similar fastener products, textile products, and molded articles may be cited. In the case of the slide fastener made of polyamide, similarly to the slide fastener made of polyester mentioned above, the component parts made of polyamide can be simultaneously dyed in the same hue by piece dyeing. As concrete examples of the polyamide which is advantageously used herein, nylon 6, nylon 66, and copolymerized nylon may be cited.

When the cloths, such auxiliary materials as lining cloths, core cloths, and sewing threads, and such resinous accessories as buttons and snaps for garments, bags, tents, etc. on which the recyclable slide fastener made of a synthetic resin according to the present invention is fitted are made of the same or homologous synthetic resin as that of the slide fastener, it is made possible to recover the used products wholly and utilize them for reclamation without requiring the individual component parts thereof to be separated and selected. When the cloth of the working clothes to be used in the fields of removal of asbestos, medical service, automobile coating, and precision machine working, for example, is made of fibers of polypropylene or high-density polyethylene and the slide fastener to be fitted thereon is made wholly of polypropylene, the produced working clothes can be handled as disposable products and, when discarded as no longer useful, can be wholly recovered and recycled. To facilitate discrimination between the products for recycling and those not for recycling, a proper identification mark may be attached to the products for recycling. A visually discernible indication such as, for example, a character, a symbol, or a bar code may be inscribed in the slider or the pin-and-box separator or may be printed on a fastener tape or a product on which a slide fastener is fitted.

When the slide fastener made of synthetic resin according to the present invention is to be discarded and then recycled, the slider and/or the pin-and-box separator is separated and selected, when necessary, from the recovered product and the remainder of the product is optionally washed and dried, thereafter fused or melted, and utilized for reclamation. Alternatively, the remainder may be granulated and then subjected to a proper treatment proper for the kind, object, and use of the synthetic resin.

In regenerating the slide fastener made of synthetic resin, the component parts thereof are formed and the coupling elements made of synthetic resin in a prescribed length are attached fast as regularly spaced to the edges of the fastener tapes made of synthetic resin fibers. In the case of coiled coupling elements, they are sewn to the edges of the fastener tapes with the sewing thread by the use of a sewing machine and then heat set. The coupling elements as attached to the fastener tapes, as occasion demands, are piece dyed in a desired color and then the slider of synthetic resin is fitted to the opposed coupling elements of the produced fastener stringers and the resultant composite is cut to a prescribed length to obtain the slide fastener of the form illustrated in FIG. 3. By fusing the lower ends of the coupling elements which are held in an engaged state, the slide fastener of the form illustrated in FIG. 4 is obtained. Otherwise by fixing the lower stop member of synthetic resin to the lower ends of the coupling elements of a prescribed length on the edges of the fastener tapes, fitting the slider to the opposed coupling elements, then fitting the upper stop members of synthetic resin to the upper ends of the coupling elements, and cutting the opposite end parts of the fastener stringers, the slide fastener of the form illustrated in FIG. 5 is obtained. The slide fastener of the form illustrated in FIG. 6 is obtained by fitting the reinforcing sheet-like members and the pin-and-box separator separated from or integrated with the sheet-like members to the lower end portions of the fastener stringers and the upper stop members to the upper ends of the opposed coupling elements.

Now, the present invention will be described more specifically by reference to working examples.

EXAMPLE 1

Primary pellets were produced by granulating and pelletizing waste PET threads emanating from a production line for synthetic resin slide fasteners by the use of a primary pellet production apparatus illustrated in FIG. 1. Then, the resultant primary pellets shaped like strand chips were dried in a drier kept in a vacuum at 5 Torr at 160° C. for 10 hours and then subjected to solid-phase polymerization in a vacuum at 0.1 Torr at 190° C. for 10 hours to produce regenerated pellets having a water content of 15 ppm. The produced regenerated pellets were extruded at a temperature of 285–305° C. to produce monofilaments having diameters in the range of 0.6 mm–0.75 mm.

The intrinsic viscosity (IV) of the regenerated pellets obtained after the solid-phase polymerization mentioned above are shown in FIG. 19 and Table 1. The IV values of the regenerated pellets obtained at different temperatures, 200° C. and 220° C., during the solid-phase polymerization, primary pellets obtained exclusively by the steps of granulation and pelletization, and master chips (yarns) are additionally shown therein. The IV values of the primary pellets obtained by the Grush method and the regenerated pellets obtained by subjecting the primary pellets to solid-phase polymerization performed similarly at 190° C. are also shown for comparison in FIG. 19 and Table 1.

TABLE 1

| | Intrinsic viscosity (IV) | | | | |
|---|---|---|---|---|---|
| Method for manufacture of primary | | | Regenerated pellets Temperature of solid-phase polymerization | | |
| pellets | Virgin | Primary pellets | 190° C. | 200° C. | 220° C. |
| Method of the invention | 0.65 | 0.62 | 0.75 | 0.92 | 1.1 |
| Grush method | | 0.59 | 0.62 | — | — |

Figure 19:
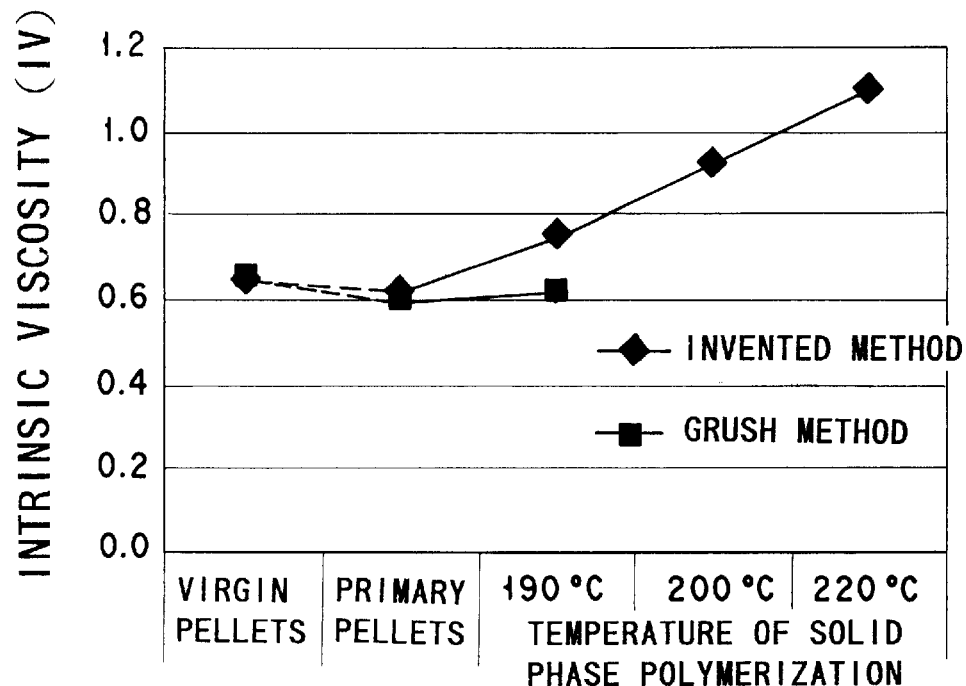
FIG. 19 is a graph showing the relation between the solid-phase polymerization temperature and the intrinsic viscosity (IV) of waste PET used in Example 1.

It is noted from FIG. 19 and Table 1 that the degree of polymerization rose and the IV value increased in accordance as the temperature of the solid-phase polymerization was elevated. In contrast, when the primary pellets were produced by the Grush method, the polymerization did not proceed very much and the IV value was heavily dispersed because the pellets contained water therein.

Then, the monofilaments obtained as described above were tested for the following items to determine the suitability thereof for coupling elements. The results of test are shown in Table 2.

In the following tests, basically the relevant properties of monofilaments manufactured from regenerated pellets or primary pellets were rated as compared with those of monofilaments manufactured from virgin PET pellets on the three-point scale, wherein an open circle, ○, denotes at least equally fine quality showing no sign of problem, an open triangle, Δ, an inferior quality showing a sign of dispersion, and a cross, ×, a defective quality either causing a problem from the viewpoint of production or deviating from the standard.

(1) Strength

The monofilaments manufactured as described above were tested for tensile strength. The symbols shown in Table 2 have the following meanings.

○: A load of not less than 20 kg was endured.

Δ: A load of about 10 kg caused breakage.

Monofilaments obtained as described above were stretched by a three-step stretching method to about 4.6 times the original length, shaped in the form of coils, sewn to the edge parts of fastener tapes made of PET fibers, and thermally set by the standard method. Thereafter, the produced fastener stringers were dyed with a quinone type disperse dye and reduced and cleaned by the standard method.

The monofilaments mentioned above were tested for workability, then for dyeability, and for heat deterioration during the course of dyeing.

(2) Workability

The symbol, ×, shown in Table 2 has the following meaning.

A pair of fastener stringers manufactured as described above, to which a die-cast slider of zinc was attached, were subjected to the British durability test and were also tested for resistance to sliding motion of the slider.

(5) British Durability Test

This test was performed by moving a slider on a given slide fastener thereby repeatedly opening and closing the slide fastener, with tension exerted meanwhile on the slide fastener in longitudinal and lateral directions.

○: Not less than 2,600 reciprocations were performed without any problem.

×: Up to 1,400 reciprocations could be performed.

(6) Resistance to Sliding Motion of Slider

One reciprocating motion was performed and the load produced by this motion was rated.

TABLE 2

| | | | | | | Properties of monofilaments rated | | |
| --- | --- | --- | --- | --- | --- | --- | --- | --- |
| Raw material | IV value | Strength | Work- ability | Dye- ability | Heat deterioration | British durability test | Resistance to sliding motion | Overall judgment |
| Primary pellets | 0.62 | Δ | × (spacer) | Δ (dark) | × (crack) | × | ○ | × |
| Regenerated pellets | 0.75 | ○ | ○ | ○ | ○ | ○ | ○ | ○ |
| | 1.1 | ○ | × (extrusion) | × (light) | ○ | ○ | ○ | × |
| Virgin pellets | 0.70 | ○ | ○ | ○ | ○ | ○ | ○ | ○ |

×(Spacer): During the course of formation of element space parts, the element parts could not be thoroughly removed and elements partly survived in the space parts.

(Space parts: In the parts of coupling elements to which the upper stop member and the lower stop member were attached, the elements in the relevant parts were partly removed prior to the attachment of the stop members. These parts are referred to as "space parts.")

×(Extrusion): Leakage of molten resin occurred during the course of extrusion of monofilaments.

(3) Dyeability

Fastener stringers using monofilaments manufactured from given pellets were dyed by immersion in the same dye bath. The dyed fastener stringers were rated for degree of pigmentation in comparison with the fastener stringers manufactured from virgin PET pellets and similarly dyed.

×(Light): Fastener stringers dyed only in light color. Even an adjustment of the dye bath failed to darken the dyed color.

Δ(Dark): Fastener stringers dyed in dark color. An adjustment of the dye bath allowed variation in the degree of pigmentation.

(4) Heat Deterioration

Dyed monofilaments were tested for tensile strength.

The monofilaments were dried by heating while they were dyed. This item of test was intended to determine the effect of the drying by heating on the monofilaments.

○: A load of not less than 10 kg was endured.

×: A load of about 1 kg inflicted a crack.

It is noted from Table 2 that the monofilaments manufactured from regenerated pellets having an IV value of 0.75 passed all the items of test mentioned above. In contrast, the monofilaments manufactured from primary pellets having an IV value of 0.62 were deficient in strength because of unduly small intrinsic viscosity and developed various troubles from the viewpoint of production. The monofilaments manufactured from regenerated pellets having an IV value of 1.1 were deficient in dyeability in spite of satisfactory physical properties and suffered an increase in the pressure of extrusion and induced leakage of molten resin because of unduly high viscosity during the process of extrusion.

EXAMPLE 2

Regenerated pellets were manufactured by following the procedure of Example 1 while using waste polybutylene terephthalate (PBT) in the place of the waste PET and performing the solid-phase polymerization in the atmosphere of nitrogen instead. In this example, however, the temperature of treatment was set at 190° C. or 200° C. during the solid-phase polymerization and a stream of dry nitrogen was continuously passed through the reaction system and the internal pressure of the reaction system was reduced to various levels to study the effect of the degree of vacuum on the reaction velocity.

Figure 20:
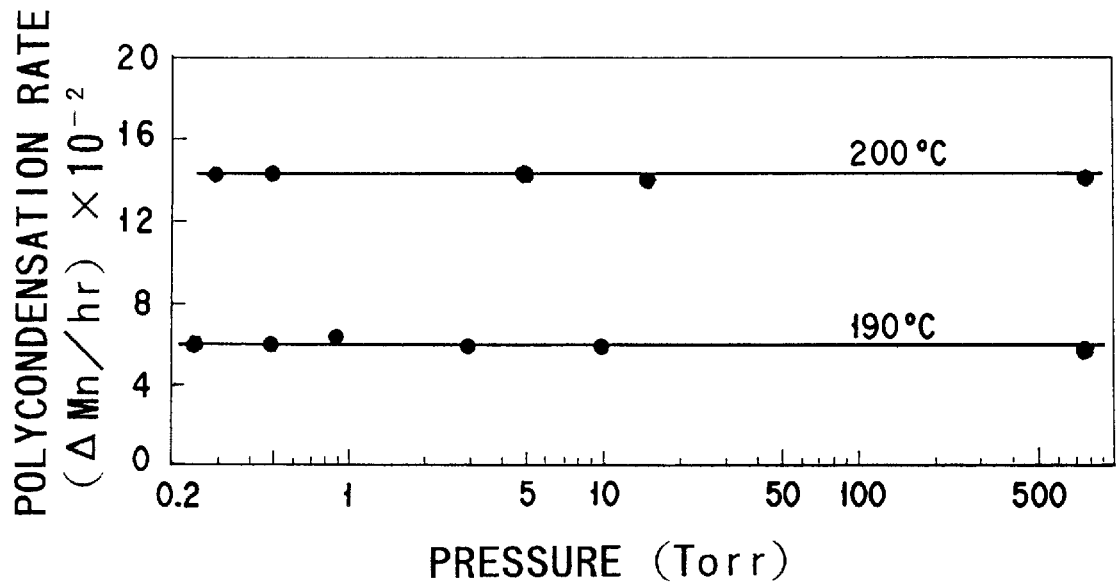
FIG. 20 is a graph showing the relation between the degree of reduction of the atmospheric pressure and the reaction rate at the solid-phase polymerization temperatures of 190° C. and 200° C. of the waste PBT used in Example 2.

The results are shown in FIG. 20. It is noted from the results shown in FIG. 20 that the varied pressure conditions of the reaction system afforded invariably satisfactory results because the reaction rate did not depend on the degree of vacuum. The results indicate that the reaction will be effected even under normal pressure so long as the by-produced water is removed. Thus, these results are very important from the practical point of view.

Then, the solid-phase polycondensation reaction of PBT obtained by melt polycondensation in Example 2 was studied to draw the following conclusion.

1) The increase of the molecular weight of PBT by the solid-phase polycondensation reaction proceeds at a reaction temperature in the range of 185–200° C. The reason for this phenomenon is that the energy for activating the polycondensation reaction in this temperature range is 29.5 Kcal/mol, a value lower than the energy for activating the thermal decomposition reaction (secondary reaction).

2) The reaction rate of solid-phase polycondensation increases in proportion as the terminal carboxyl group content of PBT used for the solid-phase polycondensation reaction decreases.

3) The water in the atmosphere of reaction has an important effect on the reaction rate. It is, therefore, recommended to perform the reaction as continuously swept with a stream of dry inert gas.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A method for manufacturing a regenerated synthetic resin product, comprising:

a step of preparing primary pellets by granulating a waste synthetic resin material with a rotary blade, heating and melting the granulated synthetic resin and deaerating and extruding the hot molten synthetic resin to obtain a strand, and then pelletizing the extruded strand, a step of preparing regenerated pellets by subjecting said primary pellets to solid-phase polymerization in a vacuum or in an atmosphere of an inert gas at a prescribed temperature, and a step of forming said regenerated pellets into a prescribed shape, wherein said waste synthetic resin material is a polyester and said solid-phase polymerization is carried out at a temperature in the range of from about 185° C. to about 200° C.

2. The method according to claim 1, wherein said hot molten synthetic resin is subjected to a treatment of filtration at said step for preparing primary pellets.

3. The method according to claim 1, wherein the water content of said regenerated pellets is not more than about 50 ppm.

4. The method according to claim 1, wherein intrinsic viscosity of said regenerated pellets is in the range of from about 0.65 to about 0.8.

5. A method for manufacturing a part of regenerated synthetic resin for a slide fastener, comprising:

a step of preparing primary pellets by granulating a waste synthetic resin material with a rotary blade kept in motion at a high speed and, at the same time, heating said waste synthetic resin material by the heat of friction with said rotary blade to a temperature not less than 20° C. lower than the melting point of the resin, deaerating and extruding the hot granulated synthetic resin while further heating and melting it to obtain a strand, and pelletizing the extruded strand, a step of preparing regenerated pellets by subjecting said primary pellets to solid-phase polymerization in a vacuum or in an atmosphere of an inert gas at a prescribed temperature, and a step of forming the regenerated pellets into a prescribed shape of a part for a slide faster, wherein said waste synthetic resin material is a polyester and said solid-phase polymerization is carried out at a temperature in the range of from about 185° C. to about 200° C.

6. The method according to claim 5, wherein said hot molten synthetic resin is subjected to a treatment of filtration at said step for preparing primary pellets.

7. The method according to claim 5, wherein the water content of said regenerated pellets is not more than about 50 ppm.

8. The method according to claim 5, wherein intrinsic viscosity of said regenerated pellets is in the range of from about 0.65 to about 0.8.

9. The method according to claim 5, wherein said regenerated pellets are extrusion molded or injection molded at said forming step to produce coupling elements for a slide fastener, monofilaments for continuous elements, upper and lower stop members, pin-and-box separators, fibers for fastener tapes, or sliders.

* * * * *